US010219109B2

(12) United States Patent
Lynch et al.

(10) Patent No.: US 10,219,109 B2
(45) Date of Patent: Feb. 26, 2019

(54) METHOD, SYSTEM AND DEVICE FOR ENABLING AN OBJECT TO ACCESS A THIRD PARTY ASSET

(71) Applicant: Faxi Limited, London (GB)

(72) Inventors: Tony Lynch, London (GB); Francois Planke, Evry (FR); Lewis Kite, London (GB)

( * ) Notice: Subject to any disclaimer, the term of this patent is extended or adjusted under 35 U.S.C. 154(b) by 0 days.

(21) Appl. No.: 14/972,226

(22) Filed: Dec. 17, 2015

(65) Prior Publication Data
US 2016/0192133 A1  Jun. 30, 2016

(30) Foreign Application Priority Data

Dec. 18, 2014 (GB) .................................. 1422548.6

(51) Int. Cl.
*H04W 4/02* (2018.01)
*H04W 4/021* (2018.01)
*G06Q 30/02* (2012.01)

(52) U.S. Cl.
CPC ............ *H04W 4/021* (2013.01); *G06Q 30/02* (2013.01); *H04W 4/023* (2013.01)

(58) Field of Classification Search
CPC ...... H04L 67/20; H04W 4/008; H04W 4/021; H04W 4/023; H04W 4/046; H04W 4/08; H04W 8/005
See application file for complete search history.

(56) References Cited

U.S. PATENT DOCUMENTS

| 9,436,180 B1* | 9/2016 | Fredinburg | ............. G06F 21/00 |
| 2005/0241003 A1 | 10/2005 | Sweeney | |
| 2011/0060600 A1* | 3/2011 | Fox | .................. G01S 19/51 |
| | | | 705/1.1 |

(Continued)

FOREIGN PATENT DOCUMENTS

| WO | 2009007752 A1 | 1/2009 |
| WO | 2011082818 A1 | 7/2011 |
| WO | 2014130090 A1 | 8/2014 |

OTHER PUBLICATIONS

United Kingdom Intellectual Property Office (UKIPO), Search Report for United Kingdom application 1422348.6, Jun. 17, 2015, p. 1, UKIPO.

(Continued)

*Primary Examiner* — Quan M Hua

(57) ABSTRACT

Provided is a computer implemented method for a vehicle used in a car share journey to access priority parking spaces in a carpark. The method includes the step of obtaining location and time data for a mobile electronic device of a user/driver of the vehicle and for a mobile electronic device of at least one other user. From this data, it is determined that the two devices are in close proximity to each other for a predetermined time and/or over a predetermined distance thereby inferring that the two users are sharing the vehicle. When one or both of the devices are detected as having reached a location on or within a boundary of a geo-fence associated with the carpark, data is communicated to a system or device of a third party associated with the carpark to alert the third party and/or provide the third party with data indicative of an identity of the vehicle and/or its driver to enable the driver to access carparking spaces allocated to car share vehicles.

12 Claims, 1 Drawing Sheet

(56) References Cited

U.S. PATENT DOCUMENTS

2013/0030882 A1\* 1/2013 Davis, III ............. G06Q 30/04
                                                                             705/13
2013/0031029 A1 1/2013 Davidson

OTHER PUBLICATIONS

European Patent Office, European Search Report, dated Mar. 31, 2016, pp. 1-3, European Patent Office, The Hague, Netherlands.

\* cited by examiner

METHOD, SYSTEM AND DEVICE FOR ENABLING AN OBJECT TO ACCESS A THIRD PARTY ASSET

FIELD OF THE INVENTION

The invention relates to a method, system and device for enabling an object to access a third party asset and, more particularly, but not exclusively to a method, system and device for enabling a high occupancy vehicle (HOV) to access reserved carparking for HOVs.

BACKGROUND OF THE INVENTION

Businesses, schools, hospitals, business districts, shopping centres, towns and whole cities are increasingly experiencing issues with vehicle congestion and parking. Some businesses have identified that some of their employees are spending up to an hour each morning attempting to find a parking space, with some employees being forced by lack of easy access to parking facilities to park so far from their place of work that they then need to take an additional bus journey to reach their place of employment. Public utilities such as hospitals and schools have reported that, come the morning rush hour, access to their premises often becomes blocked as large local traffic volumes reduces access to and from their parking areas. In many cases, the schools and hospitals have been forced to employ traffic marshals at the peak morning and afternoon traffic times in order to control the traffic and avoid traffic gridlock and other traffic related problems.

This has far reaching financial and human effects, both for the locus of these regular journeys and those undertaking the journeys, such as lost productivity, increased or additional costs to employers, schools, local authorities, etc., increased cost of transport for commuters, loss of quality of life and reduced safety.

Two of the key factors identified by employers and schools across the country as being able to help alleviate this issue are modal change and vehicle sharing. This includes encouraging people to walk, to cycle or to use public transport and, for those who still need to drive, to encourage multiple occupancy of vehicles, i.e. car sharing.

Schools and businesses are increasingly using incentive schemes to encourage commuters to choose active transport modes with point schemes or financial remuneration for those who walk or cycle rather than travel by car. These are often distance based and, surprisingly, participation is often based on trust rather than any form of evidence confirming that a person has fulfilled their obligations as specified in the incentive scheme.

One of the key issues identified so far as retarding the promotion of car sharing schemes has been policing or authenticating the activity, i.e. proving that car sharing has or has not taken place. In the USA, where 'High Occupancy Vehicle' (HOV) lanes have been employed to promote car sharing for many years, commuters have been known to buy manikins to appear to be car sharing when they are not in fact doing so. This then forces transport authorities to invest in costly infra-red cameras to detect the presence, or absence, of another person in the vehicle other than the driver. Some existing schemes investigated in the UK use a system of passes that commuters display on the dashboard of the vehicle they travelled in. However, as there is no easy way of uniquely tying a pass to a traveler at a time of travel, these are easily and frequently defrauded. Even when the parking authorities suspect that a vehicle is making use of a space reserved for car sharers without having been involved in a multiple occupancy journey there is little they can do to impose sanctions on the vehicle or its owner as there is no concrete evidence that no sharing took place.

OBJECTS OF THE INVENTION

An object of the invention is to mitigate or obviate to some degree one or more problems associated with known vehicle sharing schemes.

The above object is met by the combination of features of the main claims; the sub-claims disclose further advantageous embodiments of the invention.

Another object of the invention is to mitigate or obviate to some degree one or more problems associated with known high occupancy vehicle parking schemes.

One skilled in the art will derive from the following description other objects of the invention. Therefore, the foregoing statements of object are not exhaustive and serve merely to illustrate some of the many objects of the present invention.

SUMMARY OF THE INVENTION

The invention seeks to provide a method, system and a device by which the locations of users may be tracked by means of their associated smart phones, or other associated network/internet connected geo-location enabled devices when making their way towards a third party asset such as a carpark. The invention involves comparing location and time data for a first user with similar data from other users to confirm, or at least infer, that the first user undertook a journey with at least one other user, i.e. they journey-shared. Information indicative of the result of the comparison can then be communicated, through the internet or a wireless radio network, to a third party owner or managing entity of an asset such as a carpark to verify that the vehicle in which the users journey-shared qualifies for a reward or incentive offered by the third party such as, for example, access to parking spaces reserved for HOVs, fast track access to the carpark, reduced carpark charges or the like.

In a first main aspect, the invention provides a computer implemented method of enabling an object to access a third party asset, said object having associated with it a mobile electronic device, the method comprising the steps of: obtaining location and time data for said mobile electronic device; determining from said location and time data a location of the device relative to a geo-fence associated with a third party asset; determining that said device has reached a location on or within a boundary of said geo-fence; and in response to a determination that said device has reached a location on or within a boundary of said geo-fence, communicating data to a system or device of the third party associated with the geo-fence, said communicated data alerting said third party system or device of the foregoing determination, and/or providing data relating to an identity and/or an attribute of the object associated with the mobile electronic device to enable the third party system or device to provide the user of the mobile electronic device with access to the third party asset or a service provided by said third party asset.

In a second main aspect, the invention provides a mobile electronic device for enabling an object to access a third party asset, said object being associated with said mobile electronic device, the device comprising: a memory storing machine readable instructions; a processor configured to execute said machine readable instructions to implement the steps of the method according to the first main aspect of the invention.

In a third main aspect, the invention provides a system for enabling an object to access a third party asset, the system comprising; a server having a memory storing machine readable instructions and a processor configured to execute said machine readable instructions; a mobile electronic device associated with the object, said device having a memory storing machine readable instructions and a processor configured to execute said machine readable instructions; the server and the mobile electronic device being configured to communicate with each other over a network; wherein the server implements the steps of the method according to the first main aspect of the invention.

In a fourth main aspect, the invention provides a computer readable medium storing machine readable instructions executable by a processor of a mobile electronic device for implementing the steps of the method according to the first main aspect of the invention.

In a fifth main aspect, the invention provides a computer readable medium storing machine readable instructions executable by a processor of a server for implementing the steps of the method according to the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
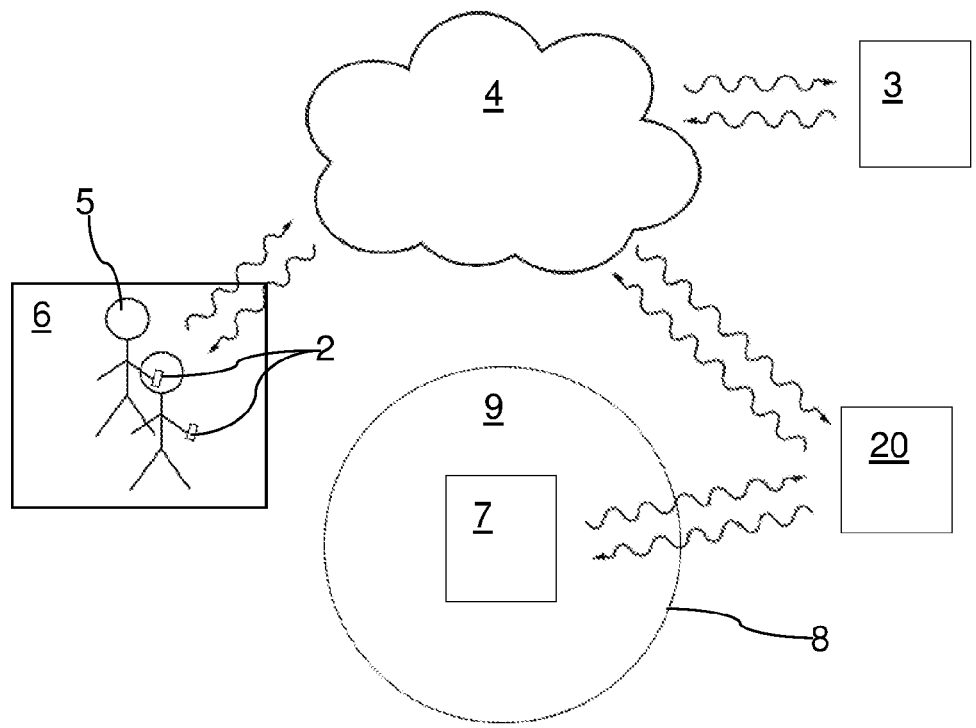
FIG. 1 is a diagram of an example of a system according to the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the figures, may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention aims to provide a system to track users via their smart phones or other mobile internet connected devices for their participation in transport oriented incentive schemes, but the invention is not limited to tracking users for car sharing and parking purposes, but could be used for tracking any objects with which a mobile electronic device can be associated and its location determined.

The invention provides a method, system and a device by which the locations of users may be tracked by means of their associated smart phones, or other associated network/internet connected geo-location enabled devices, when making their way towards a third party asset such as a carpark. The invention involves comparing location and time data for one user with similar data from other users to confirm, or at least infer, that the user undertook a journey with at least one other user, i.e. they journey-shared. Information indicative of the result of the comparison can then be communicated, through the internet or a wireless radio network, a third party owner of an asset such as a carpark to verify that the vehicle in which the users journey-shared qualifies for a reward or incentive offered by the third party such as, for example, access to parking spaces reserved for HOVs, fast track access to the carpark, reduced carpark charges or the like.

Referring to the figures, the system 1 of the invention comprises a number of user devices 2, a system server 3 and a third party entity server 20. The user devices 2 comprise handheld and/or mobile electronic devices such as smart phones, tablet computers or the like 2. Each of the user devices 2 is capable of communicating with at least the system server 3 through a network such as the Internet 4 and/or a wireless communication network 4, although this is not essential where the method of the invention is wholly carried out in one or more of the electronic devices 2 in which cases the devices 2 may be configured to connect directly through the network 4 to the third party entity server 20. In some embodiments, the system server 3 and the third party entity server 20 are hosted in one server device.

Although, for clarity, only a small number of electronic devices 2 are shown in FIG. 1, it will be understood that, in practice, the system 1 may comprise a large number of electronic devices 2, although this is again not essential as some embodiments of the method of the invention may be implemented on a single electronic processing device 2.

Figure 2:
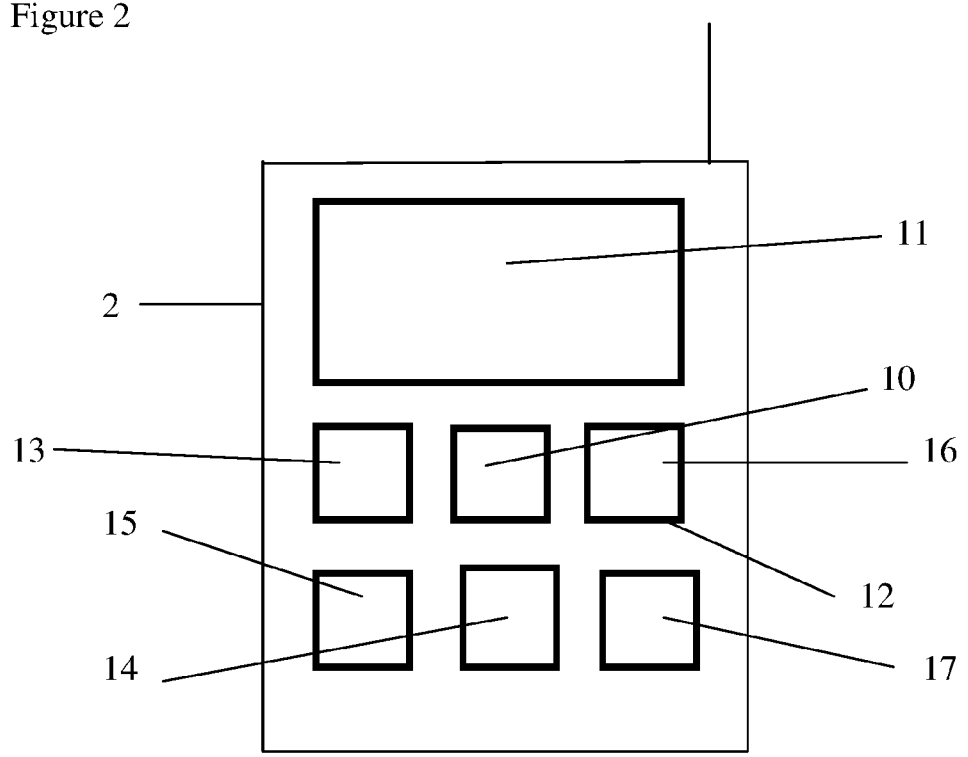
FIG. 2 is a diagram of an example of a user device used in the system of FIG. 1.

FIG. 2 illustrates an example of an electronic device 2 of the system 1 in more detail. As shown in FIG. 2, an electronic device 2 includes a data processor 10, a visual display 11, a user interface 12 allowing user instructions to be input to the device 2 and information to be presented and/or displayed to the user, a speaker 13 and a microphone 14. The various components of the electronic device 2 operate under the control of the processor 10 running machine code stored in a memory. The user interface 12 may be integrated with the visual display as a touch screen display. In other examples the user interface 12 may be a dedicated keypad separate from the visual display. Electronic devices including these components are well known to the skilled person, so these need not be described in detail here.

Further, the electronic device 2 preferably comprises a location determining means 15, a mapping or navigation module 16, and a location identifying module 11. The navigation module 16 and location identifying module 17 are arranged to receive position information from the location determining means 15. In the illustrated example the location determining means 15 is a global positioning system such as the so-called GPS. In other examples different satellite based navigation systems may be used. The navigation module 16 and the location identifying module 17 may comprise dedicated hardware, or may comprise software programs or applications running on a processor 10 of the electronic device 2a.

The location identifying module 17 uses the position information provided by the location determining means 15 to provide location based services to a user through suitable applications running on the electronic device 2. Such applications may be downloaded to the device from a network server or the like.

For clarity, the operation of the system 1 with an electronic device 2 will be discussed.

Generally speaking, the electronic device 2 is configured in one embodiment to enable an object such as a person 5 and/or their vehicle 6 to gain access to a third party asset such as a carpark 7, although the method of the invention could be applied to non-human objects with which are associated electronic devices 2 capable of operating in a network 4 and whose locations over time can be tracked; and to third party assets other than carparks such as banks, theatres depots or other entities providing services.

The method includes the step of obtaining location and time data for said mobile electronic device 2. This data may be retrieved from one or more modules of the electronic device 2 itself such as the navigation module 16 and/or the location identifying module 1, or from a network 4 within which the device 2 is operating. For example, in some wireless networks, the network servers or other assets such as base stations are able to identify the locations of mobile devices 2 and to then communicate this information to other network connected devices or systems such as system servers 3 and even third party servers 20. The location and time data for the mobile device 2 may be gathered continuously, but is preferably gathered periodically and may be gathered in response to trigger events such as when the device 2 is determined as having reached or crossed into one or more geo-fenced area or regions. The method particularly includes determining when the location of the mobile device 2 has reached a point on a geo-fence boundary 8 or has crossed said boundary 8 to be located within a geo-fence area 9 associated with, e.g. surrounding, a third party asset such as a carpark. Once the mobile device 2 is determined to have reached a point on the boundary 8 or crossed said boundary to be located within the geo-fenced area 9 of the carpark, the device 2 itself or, more preferably, a network connected server such as system server 3 implementing the steps of the method herein described communicates to a system or device such as a server 20 of the third party entity associated with the carpark (and the geo-fence around it) to alert said third party entity that the user/vehicle wishes to access the carpark. It will be understood that the size of the geo-fence boundary may be considerably larger than the asset 7 it surrounds and that the size may be chosen to allow time for a user device 2 to be detected within the geo-fenced area and for alert messages to be sent from the system server 3 to the third party entity server 20. The geo-fence may surround more than one asset 7. For example, in a town with multiple local authority carparks, the geo-fence may be selected to surround the town rather than an individual carpark.

Whilst the method herein described could be configured to be implemented wholly on one or more network connected mobile electronic devices 2 such as smart phones or the like, it is preferred that the main steps of the method are performed by a service provider server 3 to thereby ensure efficient and fair application of the method to users thereof.

Furthermore, the method is more particularly, but not exclusively intended to be applied to multiple users 5 in an arrangement which determines that such users 5 are in close proximity to one another such that it can be reasonably inferred that such users 5 are occupying a same vehicle 6. Thus, the method includes the steps of obtaining location and time data for each of a plurality of mobile electronic devices 2 where each mobile device 2 is associated with a respective user and to then compare or process said location and time data for at least two of said plurality of mobile electronic devices to determine that said at least two devices remain in close proximity to each other for a predetermined period of time and/or over a predetermined distance of travel. The predetermined amount of time and/or the predetermined amount of distance travelled may be set amounts applied to all users or may be set once the procedure is initiated taking into account specific information related to the specific users. It is envisaged that the method will enable a carpark managing entity to provide a priority service to high HOVs which is denied to vehicles occupied by only the driver. Such priority services could include, but are not limited to, providing access to carparking spaces reserved for use by only HOVs, lower carparking charges, access to more conveniently positioned carpark spaces, access to a fast entry lane into the carpark facility, etc.

The advance information or data provided to the third party carpark entity server 20 may comprise a vehicle registration number, an identity of the vehicle driver or any other information that enables the car park entity system to identify that the user's vehicle 6 is entitled to take advantage of the priority services. The use of the vehicle registration plate as the advance data communicated to the server 20 of the carpark entity may be advantageous in that it can be automatically read using a registration plate recognition system and thus may enable the user 5 of the vehicle 6 to automatically access the priority services without the intervention of a carpark employee. The foregoing method can be considered as comprising a main tracking procedure according to the invention.

Issues of fraudulent use of the system of the invention may arise where a vehicle user 5 registers two mobile devices with the server 3 of the system and then carries both within his vehicle 6. To address such concerns, the system may be configured to continue to obtain location and time data for the mobile devices 2 for a predetermined period after the advance data has been communicated to the carpark entity server 20. This predetermined period of time may be triggered later by a message from the carpark entity server 20 to the system server 3 indicating that the vehicle 6 has entered the carpark. The further comparison of time and location data of the mobile devices 2 may reveal that the devices 2 remain in close proximity and are thus being held by one user 5. In the event that it is detected that the proximity of the mobile devices 2 is such that they are no longer close, it may be inferred that they are held by different users 5 and that the vehicle 6 was indeed occupied by multiple occupants 5. To further enhance security and to prevent or deter fraud, the users of the devices 2 may be required to enter biometric data such as a fingerprint using a fingerprint scanning application on their device 2 at any point before, during and after the main tracking process, but more particularly during an initial period prior to initiation of a tracking procedure and/or during a termination or predetermined period following parking. Other types of biometric data may be utilized such as voice recognition or iris recognition. Other forms of identification may be utilized such as a user's financial authority, e.g. contract phone/tablet connection bill, or because the device 2 was issued to them by their employer.

The system server 3 may be configured to receive location and time data for mobile devices 2 even when they are not being specifically tracked in a main tracking procedure concerning a determination of whether users of such devices are occupying a same vehicle. In such cases, the server 3 may be configured to save location and time data on a sliding window principle whereby the server 3 stores data only for predetermined short period such as a last 10 or 15 minute period whilst discarding any other time and location data falling outside the window period. However, once the main tracking procedure is initiated by whatever means, the server 3 will then store all location and time data for the mobile devices 2 obtained during operation of the main tracking procedure.

The location and time data for the mobile devices 2 obtained during a period prior to initiation of the main tracking procedure may be utilized to determine that the two mobile devices have been not in close proximity prior to the main procedure being initiated, the inference being that the multiple users 5 have met up to share occupancy of a vehicle 6.

The main tracking procedure may be initiated in a number of ways including any of: a user deploying a 'track me' button in a tracking application being executed on their mobile device 2; or in response to user controlled settings, e.g. 'start tracking at [7 am] [every] [weekday] [morning]' or 'start tracking if I am within [5 m] of [User A]' or 'start tracking when I [leave] the address [MK19 0PS]' etc., where elements in '[ ]' are variable and configurable by the user. In one embodiment, the main tracking procedure may be initiated when a mobile device 2 of one user 5 crosses into a small geo-fence (not shown) allocated by the system 3 to another user's mobile device 2. The small geo-fence may be dynamic in that it moves with the mobile device 2 with which it is associated. It may be of a small size, e.g. 3 meters in diameter to, in effect, surround a user carrying a mobile device 2. The system 3 may allocate a small geo-fence to each user 5 in a group of associated users such that, when any two of such users come within a small distance of each other, one or more of their devices 2 initiate and/or confirm initiation of the main tracking process. This has the advantage of not requiring users 5 to remember to actuate a real or virtual button on their device 2 and is particularly advantageous in respect of the vehicle driver who should not be required to operate his device 2 whilst driving.

It will be appreciated that the location and time data obtained by the system server 3 for the mobile devices 2 may be utilized to determine other characteristics of the movements and locations of the devices 2 including speed and/or direction of travel.

In one embodiment, the invention includes configuring a user's mobile device 2 to control which other specific i.e. identifiable, users are authorized to trigger or initiate the main tracking procedure in the application running on their devices 2. One such arrangement may be to enable a user to enter into their application an input or setting to the effect of, for example, 'start tracking if I am within [5 m] of [User A]', 'alert when [User A] is close to me'.

In one embodiment, the system 3 is enhanced to provide means for proving that a device 2 is currently in the presence of the authorised user/owner whilst a journey share is being claimed to be taking place. This may be achieved by configuring the system server 3 to send requests challenging users for any one or more of: sensitive or security information known only to them, perform a specific action on their device 2; or telephoning or messaging the device 2 or telephoning or message all the devices 2 claimed to be part of the current journey share.

In one embodiment, the system server 3 may be configured to execute algorithms to compare the position and time data obtained for a number of different devices 2 to a statistical normal to infer which, if any, of the devices 2 is involved in travelling together, i.e. in journey-share. This, as with other forms of authenticating whether or not users of devices 2 are actually present in a journey-share experience as claimed, may be performed by the server 3 at a minimum number of data points over a journey that need to be coincident to prove that a duality or more of users 5 are indeed travelling together to provide a proof of this. This proof element may vary based on area type, e.g. urban, rural etc., and/or based on journey distance and/or duration.

In one embodiment, the system may be configured to allocate one or more geo-fences around a common target location to trigger reports, etc. as proof or evidence of car sharing by users. Take for example the situation where user X and user Y may travel from point A to target location D. Geo-fences can be 'drawn' at B (5 miles from D) and at C (1 mile from D). As the users cross boundary B, the stored location data on their devices 2 is uploaded to the system server 3 to run one or more preliminary comparisons of the data. As the users cross boundary C or more precisely their associated mobile devices 2 cross boundary C, the later stored information is uploaded to the server 3 and processed as described hereinbefore. If, when at least two of the user devices 2 cross a specified geo-fence boundary 8, preferably the geo-fence 8 associated with the target third party asset 7, this will trigger the sending of the alert and vehicle information data to the third party entity server 20 where, for example, the vehicle's registration plate number can be entered into the third party entity's parking management system to allow access to the priority services such as access to a reserved carparking space or area as well as sending the one or more of the users a notification that their car share has been authenticated and that they are free to access the reserved carparking area.

In one embodiment, the system server 3 may be configured to periodically check at times outside a main tracking procedure that a user's mobile device 2 is located away from the vehicle 6 and, more particularly, to check that the user's mobile device 2 is located at a specified location or at one of a number of specified locations such as the user's home address or the user's place of employment. As in other embodiments, such a check may be carried out by determining whether or not the user's device 2 is within a geo-fence assigned to the specified address. One purpose of this check mechanism is to enable a determination to be made that the user's device 2 is not assigned solely to the vehicle 6 to fraudulently infer that the vehicle 6 is multiply occupied when the driver is present with another mobile device 2 subscribed or registered with the tracking application system 3.

In one embodiment, the system server 3 may be configured to maintain records of the actual numbers of occupants 5 of a vehicle 6, i.e. the number of detected mobile devices 2 within close proximity to one another over a predetermined time and/or distance of travel. Such data may be used in an incentive scheme to reward vehicle drivers who maintain a high level of occupancy of their vehicle 6 in recognition that high occupancy levels reduce vehicle congestion. Such an incentive scheme might include a reduction in or a rebate of a congestion scheme charge for HOVs entering a congestion scheme charging area of a city where the system 3 of the invention can be linked to a third party congestion scheme charging area server to identify and verify vehicles 6 that in actuality meet the requirements for being deemed a HOV.

In general, the invention is concerned with a computer implemented method for a vehicle used in a car share journey to access priority parking spaces in a carpark. The method includes the step of obtaining location and time data for a mobile electronic device of a user/driver of the vehicle and for a mobile electronic device of at least one other user. From this data, it is determined that the two devices are in close proximity to each other for a predetermined time and/or over a predetermined distance thereby inferring that the two users are sharing the vehicle. When one or both of the devices are detected as having reached a location on or within a boundary of a geo-fence associated with the carpark, data is communicated to a system or device of a third party associated with the carpark to alert the third party and/or provide the third party with data indicative of an identity of the vehicle and/or its driver to enable the driver to access carparking spaces allocated to car share vehicles.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

What is claimed is:

1. A computer implemented method of providing access to a third party asset or a service provided by said third party asset, the method comprising the steps of:
   obtaining location and time data for each of a plurality of mobile electronic devices, each of said plurality of mobile electronic devices being associated with a respective one of a plurality of users, said plurality of users comprising a group of associated users;
   comparing location and time data obtained for at least one of said plurality of mobile electronic devices to location and time data obtained for at least one other of said plurality of mobile electronic devices to determine that said at least two mobile electronic devices remain in close proximity to each other for a predetermined period of time and over a predetermined distance to thereby infer that at least two users of said group of associated users have remained in close proximity for said predetermined period of time and over said predetermined distance;
   determining from said comparison of location and time data for said at least two mobile electronic devices that said at least two mobile electronic devices have reached a location on or within a boundary of a geo-fence associated with a third party asset;
   in response to a determination that said at least two mobile electronic devices have reached a location on or within a boundary of said geo-fence, communicating data to a system or device of the third party associated with the geo-fence, said communicated data providing data relating to an identity and/or an attribute of one or more users from the group of associated users to enable the third party system or device to provide said one or more users of the group of associated users with access to the third party asset or a service provided by said third party asset.

2. The method of claim 1, further comprising the step of comparing location and time data for said at least two mobile electronic devices for a predetermined period of time after said step of communicating data to the third party system of device.

3. The method of claim 2, further comprising the step of determining within said predetermined period of time that said at least two mobile electronic devices are no longer in close proximity.

4. The method of claim 1, further comprising the step of comparing location and time data for said at least two mobile electronic devices for a predetermined period of time prior to an initiation of a tracking procedure.

5. The method of claim 4, wherein the step of comparing location and time data for said at least two mobile electronic devices for a predetermined period of time prior to an initiation of a tracking procedure comprises comparing location and time data obtained for said at least two mobile electronic devices during a predetermined period prior to initiation of said tracking procedure and discarding any other location and time data obtained for other periods prior to initiation of said tracking procedure.

6. The method of claim 1, wherein an initiation of a tracking procedure for the at least two mobile electronic devices comprises the steps of:
- associating a small geo-fence with at least one of said two mobile electronic devices; and
- determining when the other of the two mobile electronic devices reaches a location on or within said small geo-fence to thereby initiate the tracking procedure.

7. The method of claim 1, wherein the location and time data for each of said at least two mobile electronic devices is obtained periodically.

8. The method of claim 1, wherein the step of communicating data to the third party system or device comprises communicating data alerting said third party system or device that a vehicle associated with a user of one of said at least two mobile electronic devices was being journey-shared with at least one other and providing data indicative of an identity of the vehicle and/or the user associated with the vehicle.

9. The method of claim 1, wherein it comprises the step of obtaining location and time data for one or more of said plurality of mobile electronic devices from the one or more mobile electronic devices themselves and/or from a network with which the one or more mobile electronic devices are communicating.

10. The method of claim 9, wherein the location data obtained for each mobile electronic device comprises location data derived from a global positioning satellite system.

11. A mobile electronic device for providing access to a third party asset, the mobile electronic device comprising:
- a memory storing machine readable instructions;
- a processor configured to execute said machine readable instructions to implement the steps of:
  - obtaining location and time data for each of a plurality of mobile electronic devices, each of said plurality of mobile electronic devices being associated with a respective one of a plurality of users, said plurality of users comprising a group of associated users;
  - comparing location and time data obtained for at least one of said plurality of mobile electronic devices to location and time data obtained for at least one other of said plurality of mobile electronic devices to determine that said at least two mobile electronic devices remain in close proximity to each other for a predetermined period of time and over a predetermined distance to thereby infer that at least two users of said group of associated users have remained in close proximity for said predetermined period of time and over said predetermined distance;
  - determining from said comparison of location and time data for said at least two mobile electronic devices that said at least two mobile electronic devices have reached a location on or within a boundary of a geo-fence associated with a third party asset; and
  - in response to a determination that said at least two mobile electronic devices have reached a location on or within a boundary of said geo-fence, communicating data to a system or device of the third party associated with the geo-fence, said communicated data providing data relating to an identity and/or an attribute of one or more users from the group of associated users to enable the third party system or device to provide said one or more users of the group of associated users with access to the third party asset or a service provided by said third party asset.

12. A non-transitory computer readable medium storing machine readable instructions executable by a processor of an electronic device for implementing the steps of the method comprising the steps of:
- obtaining location and time data for each of a plurality of mobile electronic devices, each of said plurality of mobile electronic devices being associated with a respective one of a plurality of users, said plurality of users comprising a group of associated users;
- comparing location and time data obtained for at least one of said plurality of mobile electronic devices to location and time data obtained for at least one other of said plurality of mobile electronic devices to determine that said at least two mobile electronic devices remain in close proximity to each other for a predetermined period of time and over a predetermined distance to thereby infer that at least two users of said group of associated users have remained in close proximity for said predetermined period of time and over said predetermined distance;
- determining from said comparison of location and time data for said at least two mobile electronic devices that said at least two mobile electronic devices have reached a location on or within a boundary of a geo-fence associated with a third party asset; and
- in response to a determination that said at least two mobile electronic devices have reached a location on or within a boundary of said geo-fence, communicating data to a system or device of the third party associated with the geo-fence, said communicated data providing data relating to an identity and/or an attribute of one or more users from the group of associated users to enable the third party system or device to provide said one or more users of the group of associated users with access to the third party asset or a service provided by said third party asset.

* * * * *